United States Patent [19]

Kusserow

[11] 4,363,324

[45] Dec. 14, 1982

[54] ELECTROMEDICAL APPARATUS

[75] Inventor: Bernd Kusserow, Erlangen, Fed. Rep. of Germany

[73] Assignee: Siemens Aktiengesellschaft, Berlin & Munich, Fed. Rep. of Germany

[21] Appl. No.: 181,097

[22] Filed: Aug. 25, 1980

[30] Foreign Application Priority Data

Aug. 31, 1979 [DE] Fed. Rep. of Germany ....... 2935309

[51] Int. Cl.³ ............................................. A61N 1/18
[52] U.S. Cl. ................................ 128/419 R; 128/908; 328/206
[58] Field of Search ................... 128/419 R, 421, 422, 128/423, 908; 328/206; 307/292

[56] References Cited

U.S. PATENT DOCUMENTS

| 3,321,645 | 5/1967 | Webb | 328/206 |
| 3,453,454 | 7/1969 | Kiesow et al. | 328/206 |
| 3,587,563 | 6/1971 | Ragsdale | 128/705 |
| 3,709,212 | 1/1973 | Koeblitz | 128/902 |
| 3,886,932 | 6/1975 | Suessmilch | 128/908 |
| 4,068,669 | 1/1978 | Wiemi | 128/608 |
| 4,088,141 | 5/1978 | Niemi | 128/908 |
| 4,200,108 | 4/1980 | Weigert | 128/419 R |

FOREIGN PATENT DOCUMENTS 2439587 2/1975 Fed. Rep. of Germany ...... 128/608

Primary Examiner—William E. Kamm
Attorney, Agent, or Firm—Hill, Van Santen, Steadman, Chiara & Simpson

[57] ABSTRACT

In the case of current stimulation apparatus, in particular, protection installations are necessary which, in every instance, disconnect the patient from the operating voltage of the apparatus when maximally permissible patient currents are exceeded. For this purpose, for example, safety fuses or also electromagnetic disconnection devices (relays) are known. In accordance with the disclosure, a safety circuit for disconnecting the patient output from the operating voltage is employed as the protection installation which also responds when the patient current deviates from a preselected desired value adjusted on an intensity adjustment member. For this purpose, an output stage as current waveform generator for constant-current stimulation current is connected with the safety circuit.

15 Claims, 2 Drawing Figures

ELECTROMEDICAL APPARATUS

BACKGROUND OF THE INVENTION

The invention relates to an electromedical apparatus, in particular, a current stimulation apparatus, comprising an output stage as the current waveform generator for constant-current stimulation current and comprising a protection installation, associated with the output stage, which disconnects the patient output from the operating voltage when a specifiable maximum value of the patient current is exceeded.

Known current stimulation apparatus have output stages for constant-current supply of patient current which operate with a relatively high operating voltage (up to several hundred volts). It is thus to be guaranteed that, even in the case of extremely high patient resistances, the currents with a correspondingly high operating voltage requirement, which are necessary for therapy or diagnosis, respectively, can still be applied.

Due to the high operating voltages connected to the patient, the danger could exist that, in the case of malfunction, the current flowing through the patient may assume dangerously high values. According to VDE-regulations, therefore, special protection installations are prescribed for all current stimulation apparatus and diagnosis apparatus which limit (or restrict) the patient current, in every possible instance, to $I_{Patient} < 80$ mA$_{eff}$.

From the German OS No. 2,749,792 (U.S. Pat. No. 4,200,108), a stimulation current apparatus is also known in which the protection installation is specially designed such that, in the case of increases in the patient current, brought about through rapid resistance changes, the operating voltage control unit of the apparatus is correspondingly downwardly controlled. This protection installation thus offers protection, in particular, for such an instance of malfunction in which the current supply electrodes become detached (or separated) from the application location, whereby the current transfer surface is reduced, so that the current density on the skin at the point of application can assume very high value and can thereby lead to unpleasant irritations. This protection installation is also effective against excessively rapid intensity changes resulting from too rapid operation of the intensity adjustment element. By contrast, this known circuit does not become engaged when the actually flowing patient current assumes an excessively high value due to apparatus errors, or the like. Current stimulation apparatus of the state of the art exhibits, for this purpose, so-called quick-acting safety fuses, for example, in the patient current circuit as a protection installation, which fuses are destroyed by correspondingly high currents and thus interrupt the current flow. Safety fuses of this type are, however, as is known, imprecise and also unsafe. Also, electromagnetic switching installations (relays) here bring about no fundamental improvements. Although they switch more rapidly (in the millisecond range), they are able to provide only protection against a specified excess current.

SUMMARY OF THE INVENTION

Therefore, it is the object of the invention to disclose an improved protection installation in the case of electromedical apparatus.

The object is solved in accordance with the invention in that, as the protection installation, a safety circuit for disconnecting the patient output from the operating voltage responds even when the patient current differs from the value adjusted at an intensity adjustment member, for which purpose the output stage is connected with the safety circuit.

Preferably, the safety circuit comprises a bistable switching stage, for example formed of two transistors in a push-pull circuit, which connects the patient output to the operating voltage in the one state, and which disconnects it from the operating voltage in the other state. However, the switching stage is here not only controlled solely by an excess current signal, but additionally by a signal obtained through comparison of a selected desired value of the patient current with the actually flowing current. The deviation of the patient current from the preselected desired or nominal value thus likewise effects a disconnection of the safety installation. Such a deviation, which can also consist in an undercurrent (insufficient current), is an indication of an apparatus malfunction, so that the operating voltage is also interrupted when the selected maximum value of the patient current for disconnection has not yet been attained.

In the case of a preferred realization of the safety circuit with the bistable transistor switching stage, through feedback of the collector path of the second transistor of the bistable switching stage to the emitter path of the first transistor of the bistable switching stage, the flipping over or switching off of the switching stage will occur already in the microsecond time range ($<10$ μs). This switched-off state will be maintained for as long as the operating voltage is connected. Only through disconnection and subsequent reconnection of the operating voltage does the patient current circuit with the first transistor become conductive again. The speed of the electronic safety device produced in this manner is thus more rapid by powers of ten as compared with the known safety fuses and switches.

Further advantages and details of the invention are apparent from the following Figure description of an exemplary embodiment on the basis of the drawing in conjunction with the remaining subclaims; and other objects, and advantages will be apparent from this detailed disclosure and from the appended claims.

DETAILED DESCRIPTION

Figure 1:
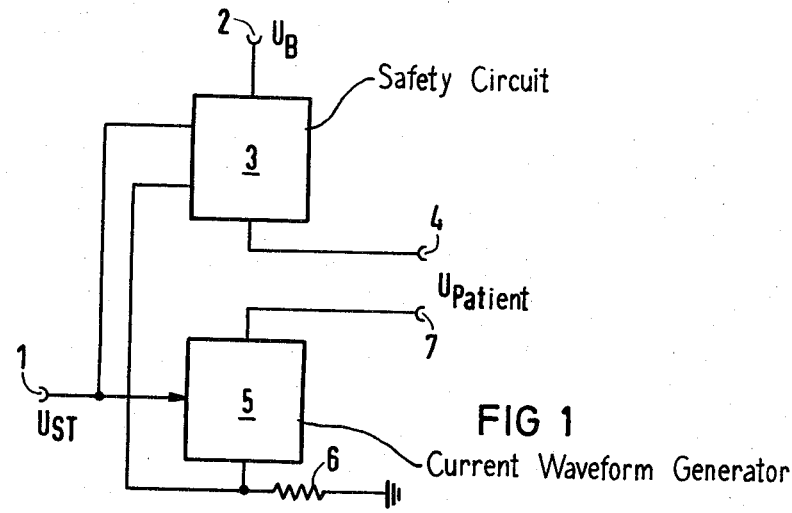
FIG. 1 illustrates a current stimulation apparatus with an output stage and a safety circuit in the form of the block circuit diagram.
Figure 2:
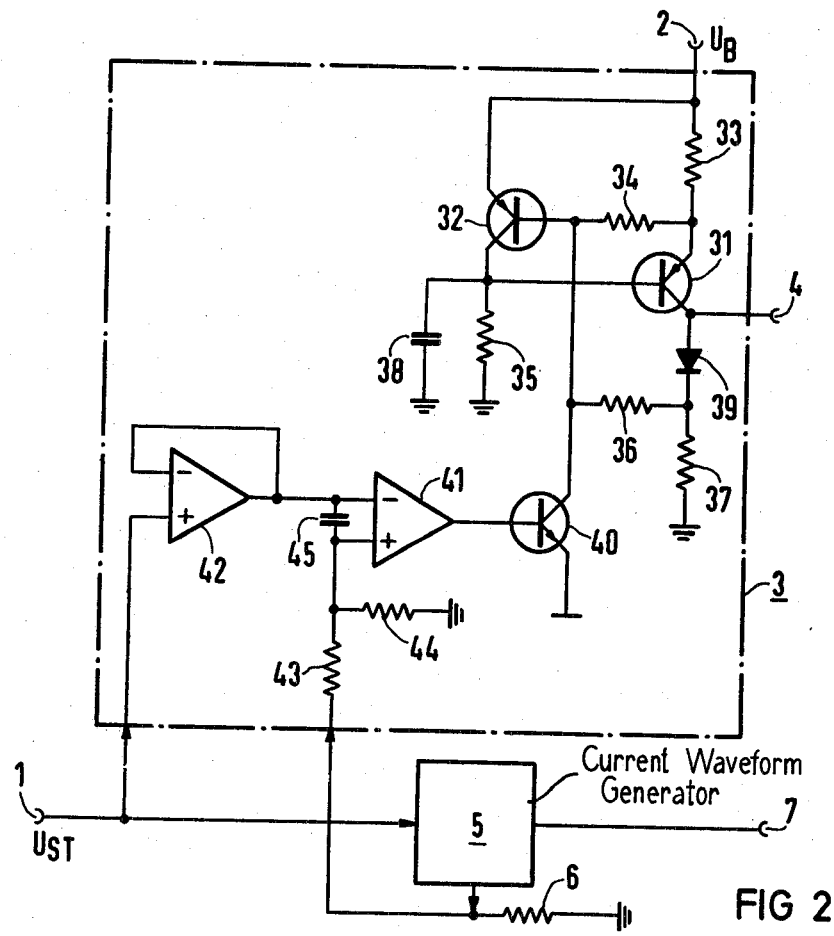
FIG. 2 illustrates an embodiment of the inventive safety circuit.

In FIGS. 1 and 2, 1 denotes a terminal for receiving a control voltage $U_{ST}$ of a current stimulation apparatus, and 2 denotes a terminal for receiving an operating voltage source. The operating voltage $U_B$ amounts, for example, to $+200$ V.

A control voltage, $U_{ST}$ which is proportional to the desired patient current, is fed in by an intensity adjustment member (not illustrated) via the control input 1. Patient currents of desired waveform can be preselected. Between the voltage terminals 1 and 2 and patient outputs 4 and 7, a safety circuit 3, as protection installation, is connected, on the one hand; and an output stage 5, as current waveform generator, is connected, on the other hand. Corresponding currents are generated from the control voltages by the output stage 5; the output stage 5 is connected to ground potential via a defined resistance 6. The current flowing in the resistance 6 corresponds to the patient current $I_{Patient}$.

From FIG. 1 it is apparent that the apparatus is so designed that the safety circuit lies in the operating voltage-conducting branch, on the one hand, but that the safety circuit also receives inputs from terminal 1 and from defined resistance 6 for representing the preselected and actual patient currents, on the other hand. The more detailed function of this inventive safety circuit can be seen in detail from FIG. 2.

In the operating voltage branch with terminals 2 and 4, a first transistor 31 is arranged in emitter-connection, whose collector path is connected to the output 4. A second transistor 32 in emitter-connection is connected in parallel to terminal 2, the voltage at the emitter of the first transistor 31, which voltage is decreased as a function of current in a resistance 33, being connected, via a resistance 34, as the control signal, to the base of the second transistor 32. The second transistor 32, in turn, is connected on the collector-side, as control line, to the base of the first transistor 31. Thus, a bistable flip-flop is formed by the transistors 31, 32, in push-pull connection. This flip-flop stage connects the patient output 4, in the one state, to the operating voltage $U_B$, and in the other state, disconnects it from the operating voltage $U_B$. The control signal for the switching stage thus formed is derived from the value of the patient current itself, on the one hand, and from a comparison of the adjusted patient current $U_{ST}$ with the actually flowing current, on the other hand. On the collector side, there is additionally parallel-connected to the second transistor 32 an RC-network with resistance 35 and capacitor 38, whereas the collector side of the first transistor 31 is fed back to the emitter path of the first transistor via a blocking diode 39 and a voltage divider with resistances 36 and 37.

The control line for the second transistor 32 is connected to the output of a comparator 41 via a third switching transistor 40. There is transmitted to the inputs of the comparator 41, the control voltage $U_{ST}$, selected at the intensity adjustment member, and a voltage corresponding to the actually flowing patient current $I_{Patient}$. For this purpose, the control voltage $U_{ST}$ is connected, in a low-resistance fashion, from the control input 1 via an operational amplifier 42 to the inverting input of the comparator 41. The operational amplifier 42 has a feedback connection from its output to its inverting input. Connected to the other input of comparator 41 is the voltage developed across the defined resistance 6, which voltage is proportional to the patient current. Via a voltage divider with resistances 43 and 44, this voltage is reduced by a specifiable value, for example, 20%. The input lines of the comparator 41 are coupled together via a capacitor 45. By means of the capacitor 45, upon selection of an intensity value as the command (or desired) value, the control voltage $U_{ST}$ is initially overcoupled to the second line. The consequence of this is that, at the comparator 41, the effectively present current intensities are actually compared, and that an output signal is generated not solely on the basis of phase shifts in the case of changing current waveforms.

During operation of the current stimulation apparatus with the described safety circuit, in the normal case, the first transistor 31 is conductive, so that the operating voltage is connected to the patient output 4 via the emitter-collector-path. The preselected current is generated via the output stage 5 and connected to the other patient output 7. If the current now increases beyond the safety-determined (or stipulated) limit value of 80 mA, the voltage drop at the resistance 33 increases correspondingly. If this voltage drop is greater than the threshold base-emitter voltage of the transistor 32, transistor 32 passes over into the conductive state, whereby the base of the first transistor 31 is activated by the collector path. Transistor 31 is thereby blocked; the cutoff protection has been activated (or triggered).

Due to the feedback via the resistance 36, the flipping-over of the bistable switching stage, formed by the transistors 31 and 32, and the blocking of the first transistor 31, proceeds very rapidly. Values of less than ten microseconds ($<10$ µs) are obtained. The blocking of transistor 31 is maintained for as long as the operating voltage $U_B$ is connected. After disconnection of the operating voltage $U_B$, the collector path of the transistor 32 is discharged via the RC-network 35, 38. With reconnection of the operating voltage, the switching stage is then always in the state in which the first transistor 31 is conducting; i.e., in which the cutoff protection is in its reset condition permitting normal operation.

With the comparator 41, during operation of the electromedical apparatus, the voltage drop at the resistance 6, which is reduced according to a preselected quantity, is constantly compared with the control voltage $U_{ST}$. Thus, if the patient current exceeds the value preselected at the intensity adjustment member connected with control input 1, for example by 20%, the comparator 41 switches over and the output signal of the comparator 41 is added to the control signal for the second transistor 32. In this manner, the second transistor is rendered conductive and, accordingly, the first transistor 31 is blocked.

In the exemplary embodiment according to FIG. 2, an operational amplifier as comparator 41 is specifically so connected that solely patient current values which are greater than the selected command (or desired) value lead to the additional activation of the safety circuit. Through connection of an additional operational amplifier with reverse polarity; or utilization of a window discriminator instead of comparator 41, all deviations (deviations of either polarity) can be detected and utilized as control signal for the bistable switching stage with transistors 31 and 32.

The cutoff protection, formed by the described circuit, thus becomes operative (or effective) in every instance even when the patient current, indeed, still lies below the allowable maximum current, but differs from the value preselected at the intensity adjustment member connected to control input 1. A particularly effective protection of the patient against malfunctions of the current stimulation apparatus is thus provided.

It will be apparent that many modifications and variations may be effected without departing from the scope of the novel concepts and teachings of the present invention.

A showing of the intensity adjustment member which supplies the preselected control value $U_{ST}$ at input terminal 1 is found in the first figure of German application No. P 29 39 234.5 filed Sept. 27, 1979, and in the corresponding U.S. application in the names of Kurt Weigert and Karl Hudek, U.S. Ser. No. 182,466 filed Aug. 28, 1980.

I claim as my invention:

1. Electromedical apparatus, in particular stimulation current apparatus, comprising a patient output, an operating voltage circuit comprising operating voltage input means for supplying an operating voltage ($U_B$) to the patient output, a control input means for supplying a preselected control value ($U_{ST}$), a patient current sensing means for supplying a measure of patient current, an output stage as current waveform generator operatively associated with the patient output and responsive to the preselected control value ($U_{ST}$) for controlling patient current in accordance therewith, and for effecting constant-current supply of such patient current, and a protection installation associated with the operating voltage circuit which protection installation disconnects the patient output from the operating voltage when a specifiable maximum value of the patient current has been exceeded, said protection installation comprising a safety circuit having switching means for the purpose of disconnecting the patient output from the operating voltage ($U_B$), said safety circuit having control means for actuating said switching means when the patient current deviates from the preselected control value ($U_{ST}$), said control means comprising comparator means connected with said patient current sensing means for receiving a measure of patient current and connected with said control input means for receiving a measure of said preselected control value ($U_{ST}$), the switching means comprising a bistable switching circuit controlled by the comparator means, said bistable switching circuit connecting the patient output with the operating voltage ($U_B$) in one switching state, and disconnecting the patient output from the operating voltage ($U_B$) in the other switching state, said comparator means being connected with said bistable switching circuit for controlling switchover of said bistable switching circuit between said one switching state and said other switching state, characterized in that said bistable switching circuit comprises first and second transistor means, said first transistor means (31) being disposed in said operating voltage circuit between said operating voltage input means (2) and said patient output (4), and being conductive in said one switching state of said bistable switching circuit, said second transistor means (32) being nonconducting in said one switching state and being coupled with said comparator means (41) so as to become conductive when the patient current deviates from the preselected control value ($U_{ST}$), said second transistor means (32) being coupled with said first transistor means (31) so as to render said first transistor means nonconducting and to switch said bistable switching circuit to said other switching state when said second transistor means becomes conducting, said operating voltage circuit having voltage drop means (33) therein for producing a voltage drop as a function of a patient current in the operating voltage circuit, said voltage drop means (33) being connected with said second transistor means (32) such that with a patient current exceeding said specifiable maximum value said second transistor means (32) is rendered conducting to switch said bistable switching circuit to said other switching state and to thereby render said first transistor means (31) nonconducting and disconnect said patient output from said operating voltage, said voltage drop means (33) being connected with said second transistor means (32) separately from the coupling of said comparator means (41) with said second transistor means (32), so that said voltage drop means (33) is capable of actuating said second transistor means (32) to conducting condition in response to a patient current exceeding said specifiable maximum value independently of said comparator means (41), a passive current path coupling said voltage drop means (33) with control electrodes of said second transistor means (32), said voltage drop means being a resistance of value such that a current therethrough above said specifiable maximum value supplies a voltage to the control electrodes of said second transistor means (32) via said passive current path above the threshold turn-on voltage for said second transistor means (32).

2. Electromedical apparatus according to claim 1, with said voltage drop means comprising electrical resistance means in series with said first transistor means, said electrical resistance means (33) being connected with said second transistor means (32) so as to bias said second transistor means (32) into conductive condition when the current through said electrical resistance means (33) exceeds that corresponding to the specifiable maximum value of patient current.

3. Electromedical apparatus according to claim 2, with said electrical resistance means comprising a first defined resistance (33) connected in series with the first transistor means (31), and means comprising a second resistance (34) connecting the first defined resistance (33) with the second transistor means (32) such that the voltage across said first defined resistance (33) is connected as a control signal to the second transistor means (32) via said second resistance (34).

4. Electromedical apparatus according to claim 1, with said comparator means (41) having coupling means (40) coupled with said second transistor means (32) for driving said second transistor means into the conductive mode when the measure of patient current as supplied to said comparator means by said patient current sensing means (6) deviates from the measure of said preselected control value ($U_{ST}$) supplied by said control input means (1).

5. Electromedical apparatus according to claim 4, characterized in that the coupling means comprises a third transistor (40) coupling the output of the comparator means (44) with the second transistor means (32) and operative for switching said second transistor means to the conductive mode.

6. Electromedical apparatus according to claim 4, characterized in that an RC-network (35, 38) is connected with the output of the second transistor means (32) and the input of the first transistor means (31) for retaining the bistable switching circuit in said other switching state after actuation of the bistable switching circuit to this state by the control means.

7. Electromedical apparatus according to claim 1, with said patient current sensing means comprising a defined resistance (6) connected between said output stage (5) and ground potential and through which patient current flows to ground potential, said comparator means having a first input coupled with said defined resistance (6) for receiving a measure of patient current based on the potential at the defined resistance (6) relative to ground potential, and having a second input coupled with said control input means for receiving the measure of the preselected control value ($U_{ST}$).

8. Electromedical apparatus according to claim 7, characterized in that the comparator means is an operational amplifier (41) having an inverting input as the second input receiving the measure of the preselected control voltage ($U_{ST}$) and having a noninverting input as the first input receiving the measure of patient current based on the voltage across said defined resistance (6), which is proportional to the patient current.

9. Electromedical apparatus according to claim 7, with said comparator means comprising window discriminator means having said first and second inputs and being connected with said bistable switching circuit for actuating said bistable switching circuit in response to deviations of said measures of either polarity as an indication of a malfunction.

10. Electromedical apparatus according to claim 7, characterized in that the control means includes voltage divider means (43, 44) having its input connected with said defined resistance (6) for receiving the voltage across said defined resistance (6) and having its output connected to said first input of said comparator means for supplying to said first input the measure of patient current based on said voltage across the defined resistance (6) and proportional to the patient current, but reduced by means of the voltage divider means (43, 44) by a defined value.

11. Electromedical apparatus according to claim 10, with said voltage divider means (43, 44) reducing the measure of patient current to about twenty percent of the voltage across said defined resistance (6).

12. Electromedical apparatus according to claim 7, characterized in that said control means includes an operational amplifier (42) with feedback connecting the preselected control value ($U_{ST}$) at the control input means (1) with the second input of the comparator means (41).

13. Electromedical apparatus according to claim 7, with said comparator means comprising a comparator (41) having the first and second inputs for receiving said measure of patient current and said measure of the preselected control value ($U_{ST}$), and having a capacitor (45) interconnecting said first and second inputs such that voltage variations at the second input of the comparator receiving the measure of the preselected control value ($U_{ST}$) are initially coupled to the first input as well.

14. Electromedical apparatus according to claim 1, characterized in that the operating voltage circuit has voltage divider means (33, 34, 36, 37) for normally holding the second transistor means (32) in its nonconducting state when operating voltage is reapplied to said operating voltage circuit, the input of the second transistor means (32) being coupled to the operating voltage circuit via said voltage divider means.

15. Electromedical apparatus according to claim 1, with said operating voltage circuit having voltage divider means (33, 34, 36, 37) and a diode (39) coupling a portion of the voltage divider means with an output electrode of said first transistor means (31), the voltage divider means having output means including said portion thereof, and coupled with the input of said second transistor means (32) such that the second transistor means (32) is subjected to a cut-off bias when the first transistor means (31) is fully conducting in the absence of a patient load.

* * * * *